United States Patent
Hardwood, III et al.

(10) Patent No.: US 6,240,493 B1
(45) Date of Patent: May 29, 2001

(54) METHOD AND APPARATUS FOR PERFORMING ACCESS CENSORSHIP IN A DATA PROCESSING SYSTEM

(75) Inventors: Wallace B. Hardwood, III; James B. Eifert, both of Austin; Thomas R. Toms, Dripping Springs, all of TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/061,974

(22) Filed: Apr. 17, 1998

(51) Int. Cl.[7] ....................................... G06F 12/14
(52) U.S. Cl. ................ 711/163; 711/156; 711/164; 710/260; 710/262; 710/264; 713/202
(58) Field of Search ................... 711/163, 164, 711/156; 713/202; 710/260, 262, 264

(56) References Cited

U.S. PATENT DOCUMENTS

| | | |
|---|---|---|
| 4,523,271 | 6/1985 | Levin . |
| 4,590,552 | 5/1986 | Guttag et al. . |
| 5,014,191 * | 5/1991 | Padgaonkar et al. ............... 711/163 |
| 5,293,610 * | 3/1994 | Schwarz .............................. 711/164 |
| 5,432,950 * | 7/1995 | Sibigtroth .......................... 711/163 |
| 6,012,145 * | 1/2000 | Mathers et al. .................... 713/202 |

* cited by examiner

*Primary Examiner*—John W. Cabeca
*Assistant Examiner*—Pierre M. Vital

(57) ABSTRACT

Method and apparatus for performing access censorship in a data processing system (10). In one embodiment, a digital data processing system (10) has a sub-system (34) that can be protected against intrusions, yet is still accessible and/or alterable under certain defined conditions. In a non-volatile storage portion (48) of the data processing system (10), censorship information is stored to enable an access control mechanism. Access control information (42) to selectively disable the access control mechanism is programmably generated. Additional access control information (44) can be employed to reprogram a data processing system (10) containing access protected data in a secure mode.

8 Claims, 4 Drawing Sheets

| INTRUSION DETECTED | INTRUSION DETECTED SINCE RESET 0 | | | | NO INTRUSION DETECTED SINCE RESET 1 | | | |
|---|---|---|---|---|---|---|---|---|
| ACCESS BIT 42 | 0 | | 1 | | 0 | | 1 | |
| FORCE INFORMATION CENSORSHIP (FIC) BIT 44 | 0 | 1 | 0 | 1 | 0 | 1 | 0 | 1 |
| CENSOR[0:1] BITS 50, 51 | 00 | 01 OR 10 | 11 | 00, 01 OR 10 | 11 | 00, 01, 10 OR 11 | | | |
| RESULTING STATUS (SEE FIG.3) | #1 | #2 | #3 | #4 | #5 | #6 | #7 | #8 | #9 | #10 | #11 |

 INDICATES THAT MEMORY ARRAY 34 CANNOT BE ACCESSED

*FIG.2*

| CENSOR CELL A 52, 54 | CENSOR CELL B 53, 55 | CENSOR BIT [0:1] VALUE 50, 51 |
|---|---|---|
| ERASED | ERASED | UNDEFINED |
| PROGRAMMED | ERASED | SET (1) |
| ERASED | PROGRAMMED | CLEARED (0) |
| PROGRAMMED | PROGRAMMED | UNDEFINED |

*FIG.4*

| RESULTING STATUS (SEE FIG.2) | RESULTING AFFECT |
|---|---|
| #1 | ACCESS CAN NOT BE CHANGED. FIC CAN BE SET.<br>MEMORY ARRAY CAN NOT BE ACCESSED.<br>CENSOR[0:1] CAN BE SET. CENSOR [0:1] CAN NOT CLEARED. |
| #2 | ACCESS CAN NOT BE CHANGED. FIC CAN BE SET.<br>MEMORY ARRAY CAN BE ACCESSED.<br>CENSOR[0:1] CAN BE SET. CENSOR [0:1] CAN CLEARED. |
| #3 | ACCESS CAN NOT BE CHANGED. FIC CAN BE SET.<br>MEMORY ARRAY CAN NOT BE ACCESSED.<br>CENSOR [0:1] CAN NOT CLEARED. |
| #4 | ACCESS CAN NOT BE CHANGED. FIC CAN NOT BE CHANGED.<br>MEMORY ARRAY CAN NOT BE ACCESSED.<br>CENSOR[0:1] CAN BE SET. CENSOR [0:1] CAN NOT CLEARED. |
| #5 | ACCESS CAN NOT BE CHANGED. FIC CAN NOT BE CHANGED.<br>MEMORY ARRAY CAN NOT BE ACCESSED.<br>CENSOR [0:1] CAN NOT CLEARED. |
| #6 | ACCESS CAN BE CLEARED. FIC CAN BE SET.<br>MEMORY ARRAY CAN BE ACCESSED.<br>CENSOR[0:1] CAN BE CHANGED. |
| #7 | ACCESS CAN BE CLEARED. FIC CAN BE SET.<br>MEMORY ARRAY CAN BE ACCESSED.<br>CENSOR[0:1] CAN BE CHANGED. |
| #8 | ACCESS CAN BE CHANGED. FIC CAN BE SET.<br>MEMORY ARRAY CAN BE ACCESSED.<br>CENSOR[0:1] CAN BE CHANGED. |
| #9 | ACCESS CAN BE CHANGED. FIC CAN NOT BE CHANGED.<br>MEMORY ARRAY CAN BE ACCESSED.<br>CENSOR [0:1] CAN NOT CHANGED. |
| #10 | ACCESS CAN BE CHANGED. FIC CAN BE SET.<br>MEMORY ARRAY CAN BE ACCESSED.<br>CENSOR[0:1] CAN BE CHANGED. |
| #11 | ACCESS CAN BE CHANGED. FIC CAN NOT BE CHANGED.<br>MEMORY ARRAY CAN BE ACCESSED.<br>CENSOR[0:1] CAN BE CHANGED. |

*FIG.3*

METHOD AND APPARATUS FOR PERFORMING ACCESS CENSORSHIP IN A DATA PROCESSING SYSTEM

FIELD OF THE INVENTION

The present invention relates in general to a data processing system, and more particularly to a method and apparatus for performing access censorship in a data processing system.

BACKGROUND OF THE INVENTION

In the data processing system art, it is often desirable to be able to protect an entire system or selected portions of a system from accesses which are defined as unauthorized. As an example, an unauthorized access may be either a read access, a write access, or both types of accesses to a memory storage device storing program or data information used by the data processing system. In some data processing systems an unauthorized access may be defined as an access to a particular resource, such as a port on a micro controller integrated circuit, that is used to access one or more external integrated circuit terminals. In yet other data processing systems, an unauthorized access may be defined as an access to a particular resource of the data processing system, such as debug circuitry or timing circuitry. Regardless of the resource to be protected, an improved approach to protecting against unauthorized accesses was desired.

BRIEF DESCRIPTION OF THE DRAWINGS

FIG. 2 illustrates, in tabular form, a set of relationships between selected control bits and signals of the data processing system illustrated in FIG. 1 in accordance with one embodiment of the present invention;

FIG. 3 illustrates, in tabular form, status states resulting from the relationships illustrated in FIG. 2 in accordance with one embodiment of the present invention;

FIG. 4 illustrates, in tabular form, how the value of censor control bits may be determined using a plurality of censor cell in accordance with one embodiment of the present invention.

DETAILED DESCRIPTION

Figure 1:
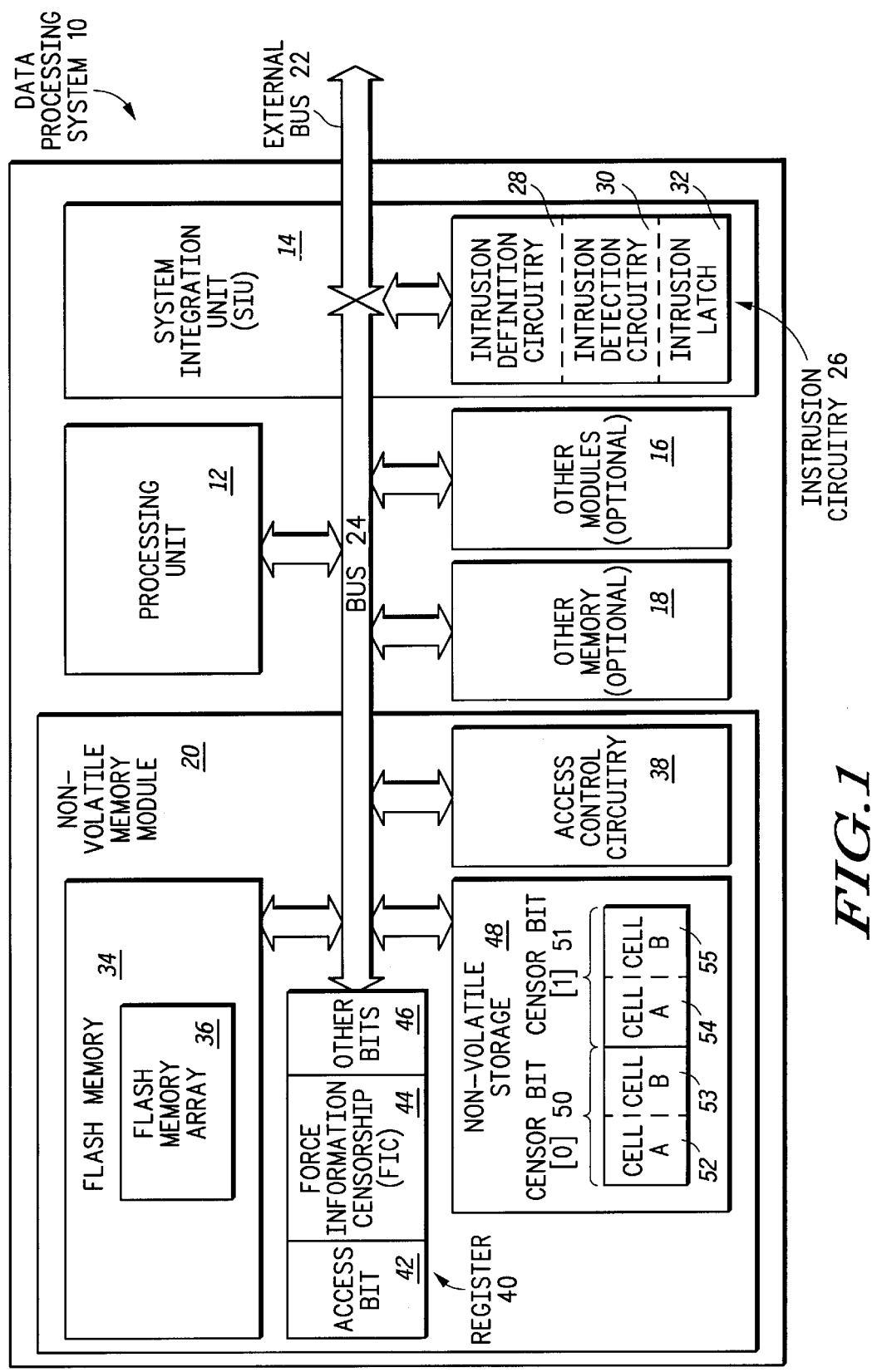
FIG. 1 illustrates, in block diagram form, a data processing system in accordance with one embodiment of the present invention.

In one embodiment of the present invention, a type of security for a data processing system was desired that allowed multiple levels of security that protected against tampering (i.e. write accesses as well as read accesses). It was also desired that a minimal set of the security be implemented in hardware, yet the approach should allow programmer flexibility at the software level so that multiple security schemes could be implemented using the same data processing system hardware. Referring to FIG. 1, in one embodiment of the present invention, data processing system 10 is implemented on a single integrated circuit. It was desirable to manufacture data processing system 10 with a security feature that allowed multiple purchasers of data processing system 10 to implement a variety of security algorithms that were proprietary to that particular purchaser. It was also desirable that the purchasers of data processing system 10 could customize their security approach so that the end user of data processing system 10 would have a more limited access to resources within data processing system 10 than was allowed to the purchaser of data processing system 10.

As an example, a purchaser of data processing system 10 may integrate data processing system 10 into a control unit used to control a generic type of appliance. Various manufacturers of this appliance may then purchase the control unit. Each manufacturer of the appliance will want to customize the security of their particular appliance. In addition, each manufacturer of the appliance will want to prevent final user accesses to data processing system 10 that are outside of a very limited definition of authorized accesses, whereas the manufacturer of the appliance will want to be able to more fully access the various subsystems within data processing system 10. For example, when field service or maintenance is provided on the appliance, the manufacturer of the appliance may need to access resources within data processing system 10 which are forbidden to the end user.

In addition, the manufacturer may wish to prevent any tampering that permanently changes memory within data processing system 10. It is also desirable that the security mechanism for data processing system 10 requires as little hardware and/or software as possible. The term censorship as used within this document is used to indicate a level of security that is less than absolute, complete security. The reason this level of security is very useful is that the manufacturer of an appliance utilizing data processing system 10 may require access to various portions of that data processing system 10 which are not allowed to be accessed by the final user of that appliance. Thus, an absolute mechanism would not work because it would not allow the manufacturer of the appliance to have the field access that is required. Thus the term censorship is used to clearly indicate that the security provided by the present invention censors or limits predetermined accesses to data processing system 10. The present invention is not necessarily intended to provide absolute security of data processing system 10.

Description of the Figures

FIG. 1 illustrates a data processing system in accordance with one embodiment of the present invention. In one embodiment data processing system 10 includes a processing unit 12, a system integration unit (IS) 14, other modules 16 (optional), other memory 18 (optional), and non-volatile memory module 20, which are all bi-directionally coupled by way of bus 24. Data processing system 10 is coupled to external circuitry (not shown) by way of external bus 22. In addition to external bus 22, data processing system 10 may be coupled to the external world by way of one or more integrated circuit terminals (e.g. integrated circuit pads, integrated circuit pins, etc.) which are coupled to one or more of the modules directly (not shown). For example, other modules 16 may include a timer module that is coupled to the external world from data processing system 10 by way of one or more integrated circuit terminals.

In one embodiment of the present invention, system integration unit 14 includes intrusion circuitry 26. In one embodiment, intrusion circuitry 26 includes intrusion definition circuitry 28, intrusion detection circuitry 30, and intrusion latch 32. Intrusion circuitry 26 is bi-directionally coupled to bus 24. In one embodiment of the present invention, internal bus 24 may include more signals than those required by external bus 22. For example, bus 24 may include any signal that must be monitored or provided by intrusion circuitry 26.

In one embodiment of the present invention, non-volatile memory module 20 includes flash memory 34, access control circuitry 38, register 40, and non-volatile storage circuitry 48, which are all bi-directionally coupled to bus 24. Flash memory 34 includes a flash memory array of cells 36 along with standard prior art circuitry required for accessing flash memory array 36. In one embodiment, register 40 includes access control bit 42, force information censorship control bit (FIC) 44, and other bits 46 which may include various control or status bits. In alternate embodiments of the present invention, the bits illustrated as being located in register 40 may be located in one or more different registers. In one embodiment of the present invention, register 40 is implemented using volatile storage circuitry; however, alternate embodiments of the present invention may use any combination of volatile and non-volatile storage circuitry to implement register 40.

In one embodiment of the present invention, non-volatile storage circuitry 48 stores a censor control bit [0] 50 and a censor control bit [1] 51. In one embodiment of the present invention, censor bit [0] 50 is implemented by way of two non-volatile storage cells, namely cell A 52 and cell B 53. Similarly, censor control bit [1] 51 is implemented using two non-volatile storage cells, namely cell A 54 and cell B 55. Thus, a plurality of non-volatile cells (Cell A and Cell B) are required to implement one of censor bits [0:1] 50, 51.

FIG. 2 illustrates the functionality of the access control circuitry 38 for one embodiment of the present invention. In one embodiment of the present invention, the first row labeled "intrusion detected" may be implemented by way of a signal provided to the access control circuitry 38 from intrusion latch 32 by way of bus 24. Intrusion detection circuitry 30 is responsible for the setting and clearing of intrusion latch 32. Intrusion definition circuitry 28 is responsible for the conditions under which intrusion detection circuitry 30 has detected that an intrusion into data processing system 10 has occurred. Alternate embodiments of the present invention may use intrusion definition circuitry 28 to define various conditions to be intrusions. In the embodiment of the present invention illustrated in data processing system 10, non-allowed accesses to flash memory array 36 are considered to be intrusions. Alternate embodiments may also consider non-allowed accesses to other memory 18 as intrusions. Yet other embodiments of the present invention may define intrusions as any non-allowed access to any portion of data processing system 10. The definition of what is an intrusion, e.g. as defined by intrusion definition circuitry 28, is entirely dependent upon the specifics of data processing system 10. In addition, alternate embodiments of the present invention may use a variety of different mechanisms to indicate that an intrusion has been detected.

Still referring to FIG. 2, the function of access control circuitry 38 is affected by the value of access bit 42, FIC bit 44, and the censor bits [0:1] 50,51. Although in the embodiment of the present invention illustrated in FIG. 1, the access control circuitry 38 and control bits 42, 44, 50 and 51 have been illustrated as being located in non-volatile memory module 20, alternate embodiments of the present invention may locate these bits and this circuitry in any portion of data processing system 10. FIG. 2 illustrates eleven possible resulting status states that may be produced by access control circuitry 38 in one embodiment of the present invention. Note that alternate embodiments of the present invention may define any number of resulting status states, some of which are different or the same as the eleven resulting status states defined in FIG. 2.

FIG. 3 illustrates the resulting effect of the eleven resulting status states illustrated in FIG. 2 for one embodiment of the present invention. Alternate embodiments of the present invention may define the resulting status states to be fewer or more, and may define the resulting status states as performing different functions than those illustrated in FIG. 3.

FIG. 4 illustrates how the values of the censor bits [0:1] 50, 51 are determined by whether censor cells A 52, 54 and censor cells B 53, 55 (see FIG. 1) are programmed. For example, if both censor cells A 52, 54 and censor cells B 53, 55 are erased, or are both programmed, the value of censor bits [0:1] 50,51 is undefined. However, if the value stored in censor cells A 52, 54 and censor cells 53, 55 are opposite from each other, (e.g., one is programmed and one is erased), then censor bits [0:1] 50, 51 have the set value or cleared value as defined in FIG. 4.

Figure 5:
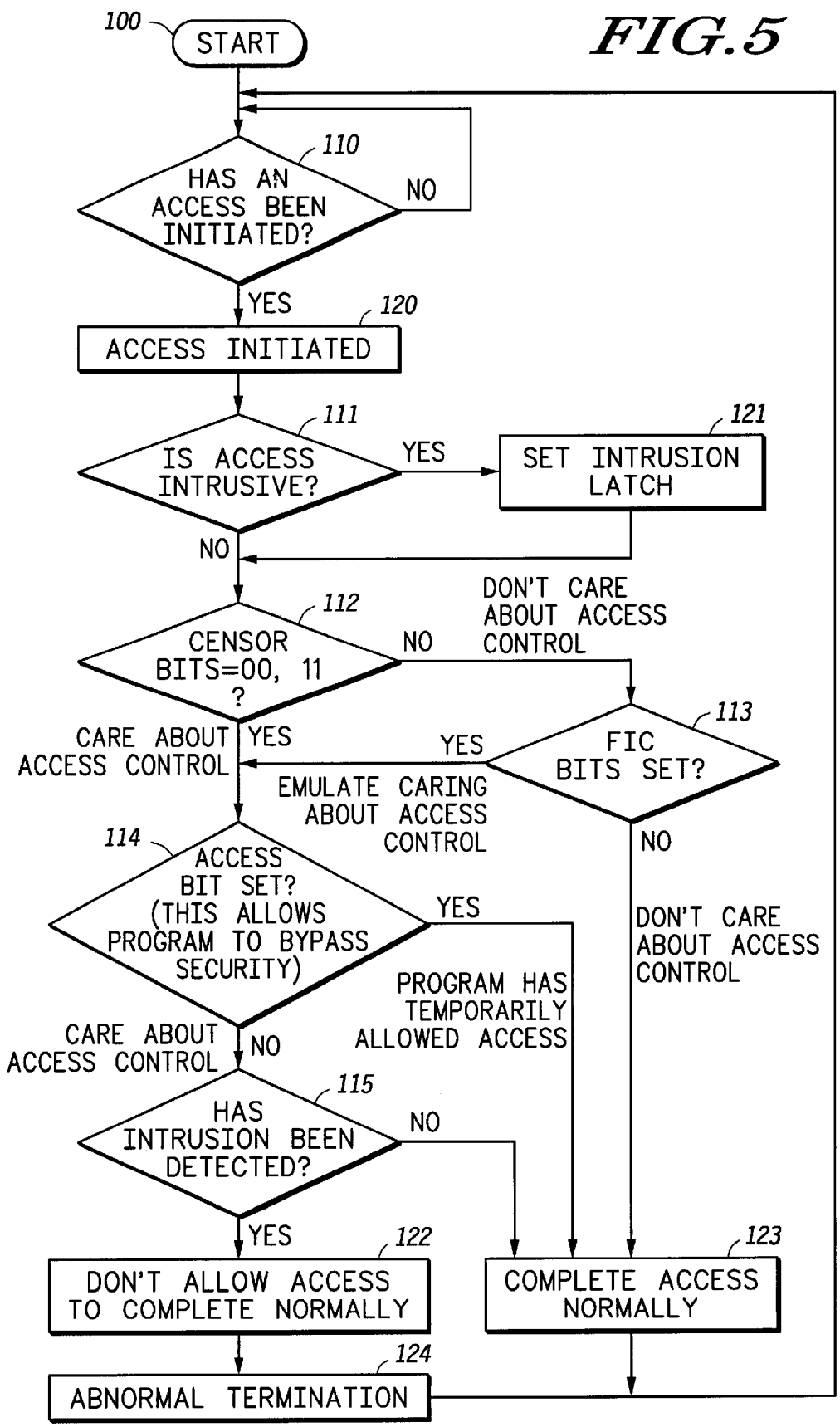
FIG. 5 illustrates, in flow diagram form, a censorship methodology in accordance with one embodiment of the present invention.

FIG. 5 illustrates how censorship is used to affect an access to data processing system 10 in accordance with one embodiment of the present invention. Referring to FIG. 5, oval 100 illustrates a starting point. Diamonds 110–115 illustrate decision points in the flow. Rectangles 120–124 illustrate steps in the flow.

Description of Operation

The operation of the present invention will now be discussed. FIG. 5 illustrates, in flow chart form, how an access to data processing system 10 (see FIG. 1) may be censored by way of the present invention. The flow diagram illustrated in FIG. 5 begins at oval 100 as the starting point. At decision diamond 110, intrusion detection circuitry 30 checks to see if an access has been initiated. If an access has not been initiated the flow returns to start 100. If an access has been initiated then the flow continues to rectangle 120 where the access is continued. Next, at decision diamond 111, intrusion detection circuitry 30 detects whether the access is intrusive. If the access is intrusive as defined by intrusion definition circuitry 28, then intrusion detection circuitry 30 stores a predetermined value in intrusion latch 32. This predetermined value indicates that an intrusion has been detected since the last reset of data processing system 10. Alternate embodiments of the present invention may use a variety of mechanisms to store this information, such as a latch, a memory device, a register cell, or any other type of storage circuitry. If the access is not intrusive, the flow continues to decision diamond 112. Similarly, after the intrusion latch 32 is set, the flow continues at decision diamond 112.

Although the embodiment of the present invention illustrated in FIG. 1 censors or disallows intrusive accesses to flash memory 34, alternate embodiments of the present invention may substitute any resource or circuitry within data processing system 10 as the destination of the access. Continuing with decision diamond 112, the state of censor bits [0:1] 50,51 are next checked to determine if the censor bits [0:1] 50, 51 have a predetermined value or values which indicate that data processing system 10 has been programmed to perform censorship and thus to care about access control. In one embodiment of the present invention, the 00 and 11 logic states for censor bits [0:1] 50, 51 are used to indicate that censorship may occur. The remaining logic states for censor bits [0:1] 50, 51 are used to indicate that the data processing system 10 does not care about access control, and thus censorship will not be performed.

If censorship is not performed, the flow continues at decision diamond 113 where the force information censorship (FIC) bit 44 is sampled. If the FIC bit 44 is set, then the flow continues at decision diamond 114. Similarly, if the censor bits [0:1] 50, 51 indicate that censorship is to be checked, the flow likewise continues at decision diamond 114. Referring back to decision diamond 113, if the FIC bit 44 is not set, then data processing system 10 does not care about access control and the flow continues at step 123 where the access is completed in a normal fashion. Referring to decision diamond 114, the logic state of access bit 42 is now checked. This allows the program to bypass the security if desired. If the access bit 42 is set, then the program has temporarily allowed access and the flow continues at step 123 where the access is allowed to complete normally. However, if the access bit 42 is not set, then data processing system 10 still cares about censorship and the flow continues at decision diamond 115.

Decision diamond 115 checks to see if an intrusion has been detected. Referring to FIG. 1, in one embodiment of the present invention, intrusion may be detected by sampling the state of intrusion latch 32. Note that for some embodiments of the present invention, decision diamond 115 is not just concerned with whether intrusion has been detected on this particular access, but may be concerned with whether intrusion has been detected on any previous access since the last reset has occurred. Still referring to decision diamond 115, if intrusion latch 32 indicates that an intrusion has not been detected, then the flow continues at step 123 where the access completes normally. However, if intrusion latch 32 indicates that intrusion has been detected, then the flow continues to step 122 where the access is not allowed to complete normally. The flow then proceeds to step 124 where an abnormal termination indication is made by data processing system 10. This abnormal termination may be reported or indicated by way of a variety of mechanisms, such as asserting a data error or bus error signal, returning a predetermined value on a portion of bus 24 or external bus 22, causing a variety of exceptions within data processing system 10 to occur, or any other available mechanism. After step 123 and 124, the flow continues back at start oval 100.

Referring to FIG. 2 please note that alternate embodiments of the present invention may define the particular logic states of the various signals and bits illustrated in a variety of ways. The particular bit definitions illustrated in FIG. 2 are merely one possible alternative. In addition, the bits and signals illustrated in FIG. 2 may be combined in a variety of ways to produce different resulting status states as those illustrated in FIG. 3. In addition each of the resulting status states may be defined differently. For example, referring to FIG. 3, resulting status state #2 may be altered so that the access control bit 42 may be changed while in this status state. Any other changes in definition of the resulting status states illustrated in FIG. 3 may be allowed for alternate embodiments of the present invention.

Referring generally to FIGS. 1 and 4, FIG. 1 illustrates one embodiment of censor bits [0:1] 50,51. In this embodiment, each censor bit 50, 51 includes a plurality of storage cells which are used in combination to determine the overall value of censor bit 50, 51. FIG. 4 illustrates one way in which the values of censor bit [0:1] 50, 51 are determined. For example, in one embodiment, censor cells 52–55 are implemented as flash memory cells which are directly accessible by access control circuitry 38 and do not have a predetermined access time as do the flash memory cells contained within flash memory array 36. Thus, the values of censor bits [0:1] 50, 51 are always directly available to access control circuitry 38 without any access of flash memory 34 required. One advantage to using two censor cells (censor cell A and censor cell B) is that only a differential voltage or current needs to be detected between these two cells in order to determine the value of the corresponding censor bits [0:1] 50, 51.

In one embodiment of the present invention the censor bits 50, 51 are implemented using two bits in order to prevent certain tampering approaches. Specifically, some embodiments of the present invention will allow more access to data processing system 10 when censor bits 50, 51 are in opposite logic states. The advantage to this is that many tampering techniques affect control bits such as censor bits 50, 51 in the same manner and thus would most likely clear or set them at the same time, thus defining more secure modes of data processing system 10 to use censor bits 50, 51 having the same value prevents some of these tampering techniques. Alternate embodiments of the present invention may use more than two censor bits 50, 51. In fact, alternate embodiments of the present invention may use any number of censor bits 50, 51. In addition, alternate embodiments of the present invention may use any number of censor cells to implement each censor bit 50, 51.

Referring to FIGS. 1, 2 and 3, access control bit 42 may be used to customize the censorship approach required by various purchasers of data processing system 10. Referring to FIG. 3, the various resulting status states determine whether access bits 42 may be changed or not. This particular feature is implemented in hardware. The purchaser of data processing system 10 may then store an access control software program in flash memory 34 or other memory within the system, e.g. other memory 18 or memory coupled to external bus 22 (not shown). This access control software program may then be used to customize when an unlimited or uncensored access is provided to data processing system 10. Thus, purchasers of data processing system 10 may use the access bit 42 in combination with an access control program written by that purchaser to determine when to disable censorship so that the purchaser may access all resources within data processing system 10 (e.g. when a product is being field serviced or when the contents of flash memory 34 are being verified). Note that in one embodiment of the present invention, censor bits [0:1] 50, 51, in conjunction with intrusion latch 32, are the mechanisms that are used to prevent all intrusive accesses by the end user.

Still referring to FIGS. 1, 2 and 3, the force information censorship (FIC) bit 44 may be used by the purchaser of data processing system 10 to debug and validate the access control program that is used to change the value of the access control bit 42. The FIC bit 44 may be used during debug to force access control circuitry 38 to perform censorship independent of the value of censor bits [0:1] 50,51. Note that in one embodiment of the present invention, the FIC bit 44 can be changed in a significant number of the resulting status states illustrated in FIG. 3. Thus, in one embodiment of the present invention, the FIC bit can be more easily changed than the censor bits [0:1] 50, 51.

In one embodiment of the present invention, when data processing system 10 is provided to a purchaser after manufacture, all accesses to all systems within data processing system 10 are allowed. This means that the purchaser of data processing system 10 is able to program flash memory 34. In addition to a user application program stored in flash memory 34, the purchaser of data processing system 10 will also want to store an access control program in flash memory 34 to control the asserting and negating of access bit 42. The purchaser of data processing system 10 will then want to verify the contents of flash memory 34 and may use the FIC bit 44 to verify the access control portion of the program stored in flash memory 34. The purchaser of data processing system 10 may then program censor bits 50, 51 to provide the required level of censorship desired for the end user. Note that the censorship scheme as described in this document provides a mechanism to prevent intrusive or non-allowed accesses by an end user while still allowing the purchaser of data processing system 10 to access the disallowed resources within data processing system 10 (e.g. flash memory 34).

While the present invention has been illustrated and described with reference to specific embodiments, further modifications and improvements will occur to those skilled in the art. It is to be understood, therefore, that this invention is not limited to the particular forms illustrated and that the appended claims cover all modifications that do not depart from the spirit and scope of this invention.

What is claimed is:

1. A data processing system, comprising:

a sub-system and a memory for storing first, second and third access control information, the memory having a non-volatile portion for storing the first access control information, the first access control information being encoded redundantly;

an intrusion logic circuit for detecting an intrusion into the data processing system, the intrusion logic circuit generating the second access control information; and a control logic circuit being coupled to the sub-system and to the memory, the control logic circuit not allowing an access to the sub-system if the first access control information is expressive of an enabling of access control, and the second access control information is indicating that the intrusion has occurred and the third access control information is expressive of not disabling the access control.

2. The data processing system according to claim 1 wherein the first access control information being encoded in an error correcting code.

3. A data processing system, comprising:

a sub-system and a memory for storing first, second and third access control information, the memory having a non-volatile portion for storing the first access control information;

an intrusion logic circuit for detecting an intrusion into the data processing system, the intrusion logic circuit generating the second access control information;

a control logic circuit being coupled to the sub-system and to the memory, the control logic circuit not allowing an access to the sub-system if the first access control information is expressive of an enabling of access control, and the second access control information is indicating that the intrusion has occurred and the third access control information is expressive of not disabling the access control; and programmable logic circuitry for programmably generating the third access control information.

4. The data processing system according to claim 3 wherein the programmable logic circuitry comprising a program storage and a processing unit, the program storage being comprised in the sub-system.

5. The data processing system according to claim 4 wherein the program storage having stored therein a first program for generating the third access control information and a second application program.

6. The data processing system according to claim 3 wherein the third access control information to be generated by the programmable logic circuitry being expressive of disabling the access control if a predefined security condition is fulfilled and if the second control access information indicates that the intrusion has not occurred.

7. A method for operating a data processing system comprising the steps of:

initiating an access operation to the data processing system;

classifying the access operation as intrusive or non-intrusive;

if the access operation is or an earlier access operation has been classified as intrusive, inhibiting the access operation;

and otherwise, if a first access control information being stored in a non-volatile portion of a memory is expressive of an enabling of access control and a third access control information is express of not disabling the access control, allowing the access operation; and in response to an external system request, running a program stored in a memory of the data processing system to programmably determine the third access control information.

8. A data processing system, comprising:

a sub-system and a memory for storing first, second and third access control information, the memory having a non-volatile portion for storing the first access control information;

the memory being adapted for storing a fourth access control information, the fourth access control information enabling the access control regardless of the first access control information;

an intrusion logic circuit for detecting an intrusion into the data processing system, the intrusion logic circuit generating the second access control information; and a control logic circuit being coupled to the sub-system and to the memory, the control logic circuit not allowing an access to the sub-system if the first access control information is expressive of an enabling of access control, and the second access control information is indicating that the intrusion has occurred and the third access control information is expressive of not disabling the access control.

\* \* \* \* \*

UNITED STATES PATENT AND TRADEMARK OFFICE
CERTIFICATE OF CORRECTION

PATENT NO.    : 6,240,493 B1
DATED         : May 29, 2001
INVENTOR(S)   : Harwood III et al.

It is certified that error appears in the above-identified patent and that said Letters Patent is hereby corrected as shown below:

<u>Title page,</u>
Author's name: change "Hardwood" to -- Harwood --

Signed and Sealed this

Nineteenth Day of March, 2002

Attest:

JAMES E. ROGAN
*Director of the United States Patent and Trademark Office*

*Attesting Officer*